Jan. 23, 1968  J. N. PEARSE  3,365,625
CAPACITOR DISCHARGE OPERATED RELAY FLIP-FLOP
Filed June 10, 1965
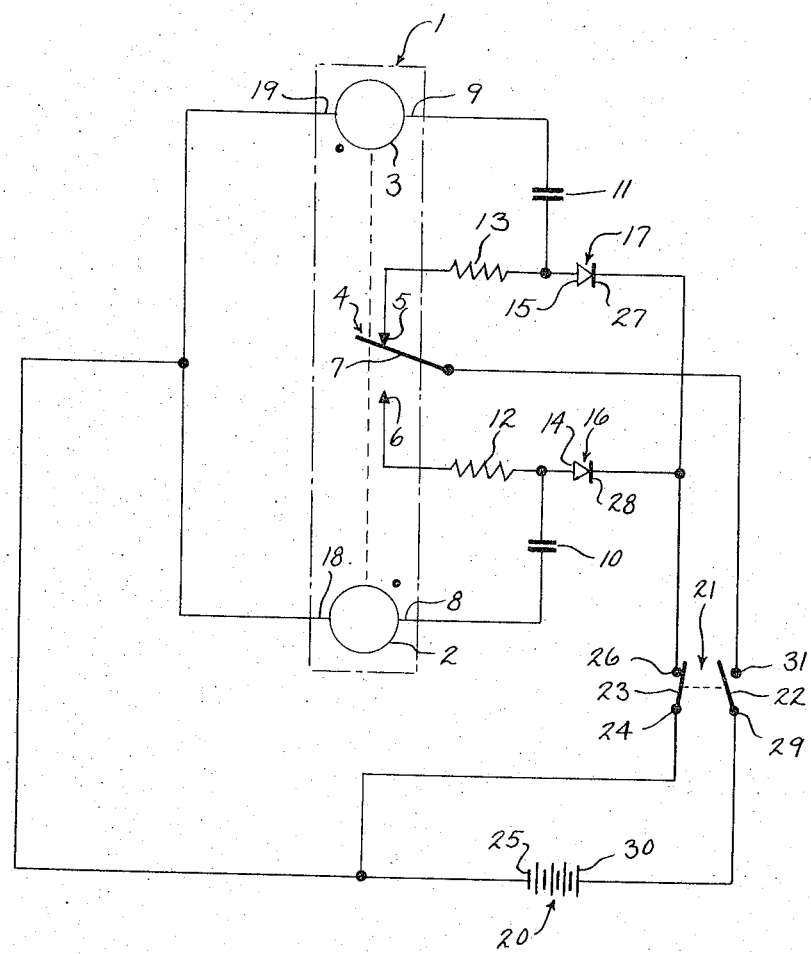
INVENTOR
JAMES N. PEARSE
BY
ATTORNEY

United States Patent Office 3,365,625
Patented Jan. 23, 1968

3,365,625
CAPACITOR DISCHARGE OPERATED RELAY FLIP-FLOP
James N. Pearse, Menomonee Falls, Wis., assignor to Allen-Bradley Company, Milwaukee, Wis., a corporation of Wisconsin
Filed June 10, 1965, Ser. No. 462,850
3 Claims. (Cl. 317—151)

ABSTRACT OF THE DISCLOSURE

The flip-flop has a single relay including an energizing coil, a deenergizing coil, and a common contact alternately contacting two stationary contacts. The coils are connected in common at one end to a negative terminal of a D-C input source and the common contact is connected through an input switch to the positive terminal. The coils are connected through capacitors to separate stationary contacts. Each of the capacitors is connected to discharge through a discharge switch to the negative terminal of the D-C input source. The discharge and input switches are connected in break-before-make relationship.

---

The invention relates to a flip-flop having a relay with an energizing coil and a deenergizing coil for actuating contact means, a capacitor in series between said contact means and each of said coils, and an input switch that alternately completes a charging circuit through said contact means to said capacitors, or a discharging circuit to said capacitors, the contact means being arranged to alternately connect one or the other of said capacitors to said capacitor charging circuit.

The present invention provides a relay flip-flop for use in counters, shift registers and other flip-flop applications. A relay flip-flop embodying the present invention may be preferred over electronic flip-flops in many situations, since it can provide an immediately usable output signal requiring neither amplification nor other modification, and, by the mere addition of output contacts, it can provide numerous output signals. Also, a relay flip-flop embodying the present invention can have a permanent memory capable of surviving power failures, so that when power is restored after a failure the flip-flop will be in the condition it was in at the time of the power outage. For these and other reasons, such relay flip-flops find many applications where other types of flip-flops would either be less desirable, if not altogether inadequate.

In addition to those advantages, the present invention also provides a relay flip-flop that operates on trailing edge logic so as to provide asynchronous operation. This feature permits the use of this flip-flop not only in installations where the clocking signal is available, but as well in applications where there is no clocking signal or where synchronous operation would not be satisfactory. Also, a flip-flop according to the present invention manifests extraordinary economy of circuitry, inasmuch as the desired results are achieved by the invention with a single relay, utilizing the discharge current from capacitors connected in series with the relay coils to energize the relay coils and thus actuate the contacts.

Accordingly, it is an object of the present invention to provide a relay flip-flop capable of asynchronous operation and trailing edge logic.

It is another object of the present invention to provide a relay flip-flop which achieves maximum circuit economy by requiring only a single relay module.

It is another object of the present invention to provide a relay flip-flop that may readily be modified to provide either leading edge or trailing edge logic.

It is another object of the present invention to provide a relay flip-flop of high reliability and stability.

The foregoing and other objects and advantages of the present invention will become apparent from the disclosure to follow. In the course of the disclosure reference will be made to the attached drawing which forms a part of this disclosure in order that a preferred embodiment of the present invention may be described in such full, clear, concise and exact terms as to enable any person skilled in the art to which it pertains to make and use the invention. However, the subject matter of the invention is to be distinguished from the preferred embodiment thereof described here, as it will be apparent that various modificatons and embellishments may be made on this embodiment without departing from the subject matter of the invention which is set forth in the claims at the conclusion of this specification.

In the drawing:

The figure is a schematic diagram of a preferred embodiment of the present invention.

In the drawing, a relay 1, set off in a broken line box, is a latching relay, though the latching means are not shown, and it contains an energizing coil 2 and a deenergizing coil 3. The relay coils 2 and 3 actuate contact means 4 that are diagrammed in the form of a single-pole-double-throw contact arrangement having two stationary contacts 5 and 6 and a common movable contact 7. Each of the coils 2 and 3 has its input end 8 and 9 respectively connected to one plate of a capacitor 10 and 11, respectively. The other plate of each of the capacitors 10 and 11 is connected in common to a current limiting resistor 12 and 13, respectively, and an anode 14 and 15 of a blocking diode 16 and 17, respectively. The current limiting resistors 12 and 13 are connected respectively to the stationary poles 6 and 5 of the contact means 4. The signal return ends 18 and 19, respectively, of the coils 2 and 3 are connected in common.

An input signal source 20 is represented in the drawing by a diagram for a battery, indicating a unidirectional current source. An input signal switch 21 is made up of a capacitor charging switch 22 and a capacitor discharging switch 23 connected to provide make-before-break operation.

One terminal 24 of the capacitor discharging switch 23 is connected in common with the common connected ends 18 and 19 of the coils 2 and 3 to a negative terminal 25 of the input signal source 20, and the opposite terminal 26 of the capacitor discharge switch 23 is connected to the cathodes 27 and 28 of the blocking diodes 16 and 17, respectively. One terminal 29 of the capacitor charging switch 22 is connected to a positive terminal of the input signal source 20, and the other terminal of the capacitor charging switch 22 is connected to the common contact 7 of the contact means 4. When closed, the capacitor charging switch 22 completes a charging circuit for the capacitors 10 and 11, and when the capacitor charging switch 22 is open, the capacitor discharging switch 23 is closed, completing a discharge circuit for the capacitors 10 and 11.

To operate the flip-flop described above, the input signal switch 21 is actauted to close the capacitor charging switch 22, thus opening the capacitor discharging switch 23. An input signal passes from the positive terminal 30 of the input signal source 20 through the capacitor charging switch 22, the common contact 7 of the contact means 4 to the stationary contact 5 of the contact means 4, and hence through the current limiting resistor 13 to charge the capacitor 11. The capacitor charging signal passes through the deenergizing coil 3, entering from the input end 9 and passing out through the return 19 back to the negative terminal 25 of the signal source 20. The charging current of the capacitor 11 has no effect on the condition of the flip-flop, inasmuch as it energizes the deenergizing coil 3 at a time when the flip-flop is already in a deenergized state.

The second time the signal switch 21 is actuated, opening the charging switch 22 and closing the discharging switch 23, a discharging circuit will be completed for the capacitor 11. The signal for discharging the capacitor 11 passes through the blocking diode 17, the closed discharging switch 23, entering the deenergizing coil 3 from the signal return end. This discharge signal, therefore, energizes the relay 1. When the relay 1 is energized, the common contact 7 of the contact means 4 is moved from its normal position in contact with the stationary contact 5 to its energized position in contact with the other stationary contact 6.

With the common contact 7 of the contact means 4 latched in the energized position against the lower stationary contact 6 of the contact means 4, the input switch 21 may be actuated again, this time closing the capacitor charging switch 22 and opening the capacitor discharging switch 23. Charging current passes from the positive terminal 30 of the input signal source 20 through the charging switch 22, the common contact 7 of the contact means 4, the stationary contact 6 of the contact means 4, and the current limiting resistor 12 to charge the capacitor 10. Inasmuch as the relay is already energized the charging current of the capacitor 10 passing through the energizing coils 2 will only tend to hold the relay in its energized position.

After the capacitor 10 is charged, the input switch 21 may be actuated a fourth time, moving it back into the position shown in the drawing, with the charging switch 22 open and the discharging switch 23 closed. Now the charged capacitor 10 will discharge through the diode 16, the discharging switch 23, and the energizing coil 2, entering from the return signal end 18 of coil 2. Hence, the capacitor discharging current will have a deenergizing effect upon the relay 1 restoring the common contact 7 of the contact means 4 to the position shown in the drawing in contact with the upper stationary contact 5. The flip-flop is now restored to its normal, deenergized condition.

It is apparent from the foregoing that for every two actuations of the input switch, the flip-flop changes condition, and this provides the frequency dividing operation of the flip-flop. It is also apparent from the foregoing description that when the normal position of the common contact 7 of the contact means 4 is that shown in the drawing the flip-flop functions as a trailing edge logic device, changing conditions only on the trailing edge of the input signal. It will be equally apparent that by modifying the embodiment shown in the drawing so that the normal position of the common contact 7 of the contact means 4 is not as shown in the drawing, but rather would be in the opposite position, in contact with the lower stationary contact 6, the flip-flop would function as a leading edge logic device, changing conditions on the leading edge of the input signal. Functioning as a leading edge logic device it is apparent that it would operate only as a synchronous flip-flop requiring a blocking signal to prevent it from running away. However, as a trailing edge logic device it would function equally well synchronously and asynchronously, with a clocking signal and without a clocking signal.

The primary purpose for the current limiting resistors 12 and 13 is to minimize the capacitors 10 and 11 charging current as compared with the discharging current of those capacitors 10 and 11 which is intended to operate the relay 1. However, the resistors 12 and 13 could also obviously be used to effect the timing of the operation of the flip-flop. Those and other variations will be apparent to persons skilled in the art and hence the preferred embodiment shown is not to be taken as reflecting the entire scope of the invention. Instead, the subject matter of the invention is set forth in the claims to follow.

I claim:
1. A relay flip-flop comprising the combination of
   a latching relay having energizing and deenergizing coils connected in common at one end and contact means;
   a charging input switch connected to a common contact of said contact means;
   a discharging input switch;
   a first capacitor having one plate connected to a second contact of said contact means and to said discharging input switch, and having another plate connected to said deenergizing coil;
   a second capacitor having one plate connected to a third contact of said contact means and to said discharge input switch, and having another plate connected to said energizing coil;
   said contact means being adapted to alternately complete a circuit from said common contact to said second contact and said third contact.
2. A relay flip-flop comprising the combination of
   a relay having contact means with a first contact, and a second contact alternately completing circuits with a common contact, and energizing and deenergizing coils with signal return ends connected in common for actuating said contacts;
   a first capacitor having one plate connected to an input end of said deenergizing coil and another plate connected to said first contact of said contact means and to a blocking diode;
   a second capacitor having one plate connected to an input end of said energizing coil and another plate connected to said second contact of said contact means and to a blocking diode;
   a discharging input switch connecting said diodes to said common connected ends of said coils;
   and a charging input switch connected to said common contact of said contact means.
3. A relay flip-flop as set forth in claim 2 wherein a current limiting resistor is connected in series between said first capacitor and said first contact of said contact means, and another current limiting resistor is connected in series between said second capacitor and said second contact of said contact means.

References Cited
UNITED STATES PATENTS

| | | | |
|---|---|---|---|
| 3,264,499 | 8/1966 | Moser et al. | 307—132 |
| 3,189,794 | 6/1965 | Currie | 317—140 |
| 2,914,710 | 11/1959 | Bell | 317—140 |

MILTON O. HIRSHFIELD, *Primary Examiner.*

J. SILVERMAN, *Assistant Examiner.*